(12) United States Patent
Pathania

(10) Patent No.: US 11,122,586 B2
(45) Date of Patent: Sep. 14, 2021

(54) COEXISTENCE OF MULTIPLE RADIO TECHNOLOGIES IN A SHARED FREQUENCY BAND

(71) Applicant: DISH Network L.L.C., Englewood, CO (US)

(72) Inventor: Amit Pathania, Herndon, VA (US)

(73) Assignee: DISH Network L.L.C., Englewood, CO (US)

( * ) Notice: Subject to any disclaimer, the term of this patent is extended or adjusted under 35 U.S.C. 154(b) by 54 days.

(21) Appl. No.: 16/731,914

(22) Filed: Dec. 31, 2019

(65) Prior Publication Data

US 2021/0204305 A1 Jul. 1, 2021

(51) Int. Cl.
| | |
|---|---|
| H04L 12/28 | (2006.01) |
| H04W 72/12 | (2009.01) |
| H04W 72/04 | (2009.01) |
| H04W 16/14 | (2009.01) |
| H04J 1/16 | (2006.01) |

(52) U.S. Cl.
CPC ....... H04W 72/1215 (2013.01); H04W 16/14 (2013.01); H04W 72/0453 (2013.01)

(58) Field of Classification Search
CPC ...... H04L 5/0023; H04W 16/14; H04W 88/06
USPC .................. 370/252, 329, 386, 478
See application file for complete search history.

(56) References Cited

U.S. PATENT DOCUMENTS

2014/0307819 A1\* 10/2014 Paulraj .............. H04W 72/0433
375/267
2017/0164349 A1 6/2017 Peiying et al.
2017/0347271 A1 11/2017 Robert et al.
2019/0208532 A1 7/2019 Basuki et al.
2020/0351818 A1\* 11/2020 Park ...................... H04W 76/28

FOREIGN PATENT DOCUMENTS

| EP | 3 637 912 A1 | 4/2020 |
|---|---|---|
| WO | 2018/226065 A1 | 12/2018 |

OTHER PUBLICATIONS

International Search Report and Written Opinion for PCT/US2020/066745 dated May 7, 2021, all pages.

\* cited by examiner

*Primary Examiner* — John Pezzlo
(74) *Attorney, Agent, or Firm* — Kilpatrick Townsend & Stockton LLP

(57) ABSTRACT

Novel techniques are described for coexistence of multiple radio technologies in a shared frequency band. Techniques described herein enable multiple radiofrequency networks using different radio technologies to coexist on a same carrier frequency by exploiting various frequency- and/or time-domain sharing of scheduled resources. For example, data signals are received for transmission over different radio networks according to different radio technologies (having different respective sub-carrier definitions and timeslot definitions). A coexistence resource schedule is computed from the communication resource grids define an allocation of sub-carrier and/or timeslot resources among the radio technologies. Radio technologies can then be generated from the data signals in accordance with the coexistence resource schedule and the communication resource grids. The radio signals can then be transmitted over the radio networks, with the multiple radio technologies coexisting in orthogonal components of a communication channel.

20 Claims, 6 Drawing Sheets

COEXISTENCE OF MULTIPLE RADIO TECHNOLOGIES IN A SHARED FREQUENCY BAND

FIELD

This invention relates generally to radiofrequency communications, and, more particularly, to coexistence of multiple radio technologies in a shared frequency band.

BACKGROUND

Wireless spectrum is a limited resource with many competing demands on the resource. Spectrum management techniques are carefully applied to facilitate concurrent use of the spectrum by many entities while limiting interference between those uses. However, constant innovations in spectrum use and management have been needed to keep up with ever-increasing demands for spectrum (e.g., for bandwidth). For example, entities build out networks to communicate in different frequencies with different radio technologies in accordance with different standards. However, recent technological convergences are tending to push different radio technologies into similar frequency bands. For example, television broadcasters have begun communicating over-the-air digital broadcast television in accordance with the ATSC 3.0 radio technology standard. Under ATSC 3.0, television channels can be broadcast using the same frequency bands as those being used for mobile communications, such as under 3GPP. Such convergences can create new opportunities for entities, but also create new challenges for spectrum management and network design.

BRIEF SUMMARY

Among other things, embodiments provide novel systems and methods for coexistence of multiple radio technologies in a shared frequency band. Techniques described herein enable multiple radiofrequency networks using different radio technologies to coexist on a same carrier frequency by exploiting various frequency- and/or time-domain sharing of scheduled resources. For example, data signals are received for transmission over different radio networks according to different radio technologies (having different respective sub-carrier definitions and timeslot definitions). A coexistence resource schedule is computed from the communication resource grids define an allocation of sub-carrier and/or timeslot resources among the radio technologies.

Radio technologies can then be generated from the data signals in accordance with the coexistence resource schedule and the communication resource grids. The radio signals can then be transmitted over the radio networks, with the multiple radio technologies coexisting in orthogonal components of a communication channel.

According to one set of embodiments, a gateway system is provided for coexistence of multiple radio technologies in a shared carrier. The system includes: a receiver subsystem to receive a first data signal for communication via a first radio technology that defines a first communication resource grid having a first sub-carrier definition and a first timeslot definition, and to receive a second data signal for communication via a second radio technology that defines a second communication resource grid having a second sub-carrier definition and a second timeslot definition; a coexistence scheduler to compute a coexistence resource grid from the first communication resource grid and the second communication resource grid to define a division of transmission resources into a plurality of sub-carriers of a carrier frequency according to a coexistence sub-carrier definition and into a plurality of timeslots according to a coexistence timeslot definition; a first radio-technology-specific scheduler, coupled with the receiver subsystem and the coexistence scheduler and having the first communication resource grid stored in communication therewith, to generate a first radio signal by scheduling the first data signal to consume a first subset of the sub-carriers and a first subset of the timeslots of the coexistence resource grid in accordance with the first radio technology; and a second radio-technology-specific scheduler, coupled with the receiver subsystem and the coexistence scheduler and having the second communication resource grid stored in communication therewith, to generate a second radio signal by scheduling at least a portion of the second data signal to consume a second subset of the sub-carriers and a second subset of the timeslots of a remaining portion of the coexistence resource grid subsequent to the scheduling the first data signal in accordance with the second radio technology.

According to another set of embodiments, a method is provided for coexistence of multiple radio technologies in a shared carrier. The method includes: receiving a first data signal for communication via a first radio technology that defines a first communication resource grid having a first sub-carrier definition and a first timeslot definition; receiving a second data signal for communication via a second radio technology that defines a second communication resource grid having a second sub-carrier definition and a second timeslot definition; computing a coexistence resource grid from the first communication resource grid and the second communication resource grid to define a division of transmission resources into a plurality of sub-carriers of a carrier frequency according to a coexistence sub-carrier definition and into a plurality of timeslots according to a coexistence timeslot definition; generating a first radio signal for transmission of the first data signal over the carrier frequency by scheduling the first data signal, according to the coexistence resource grid, to consume a first subset of the sub-carriers and a first subset of the timeslots; and generating a second radio signal for transmission of the second data signal over the carrier frequency by scheduling at least a portion of the second data signal to consume a second subset of the sub-carriers and a second subset of the timeslots of a remaining portion of the coexistence resource grid subsequent to the scheduling the first data signal.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a second label (e.g., a lower-case letter) that distinguishes among the similar components. If only the first reference label is used in the specification, the description is applicable to any one of the similar components having the same first reference label irrespective of the second reference label.

DETAILED DESCRIPTION

Embodiments of the disclosed technology will become clearer when reviewed in connection with the description of the figures herein below. In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Figure 1:
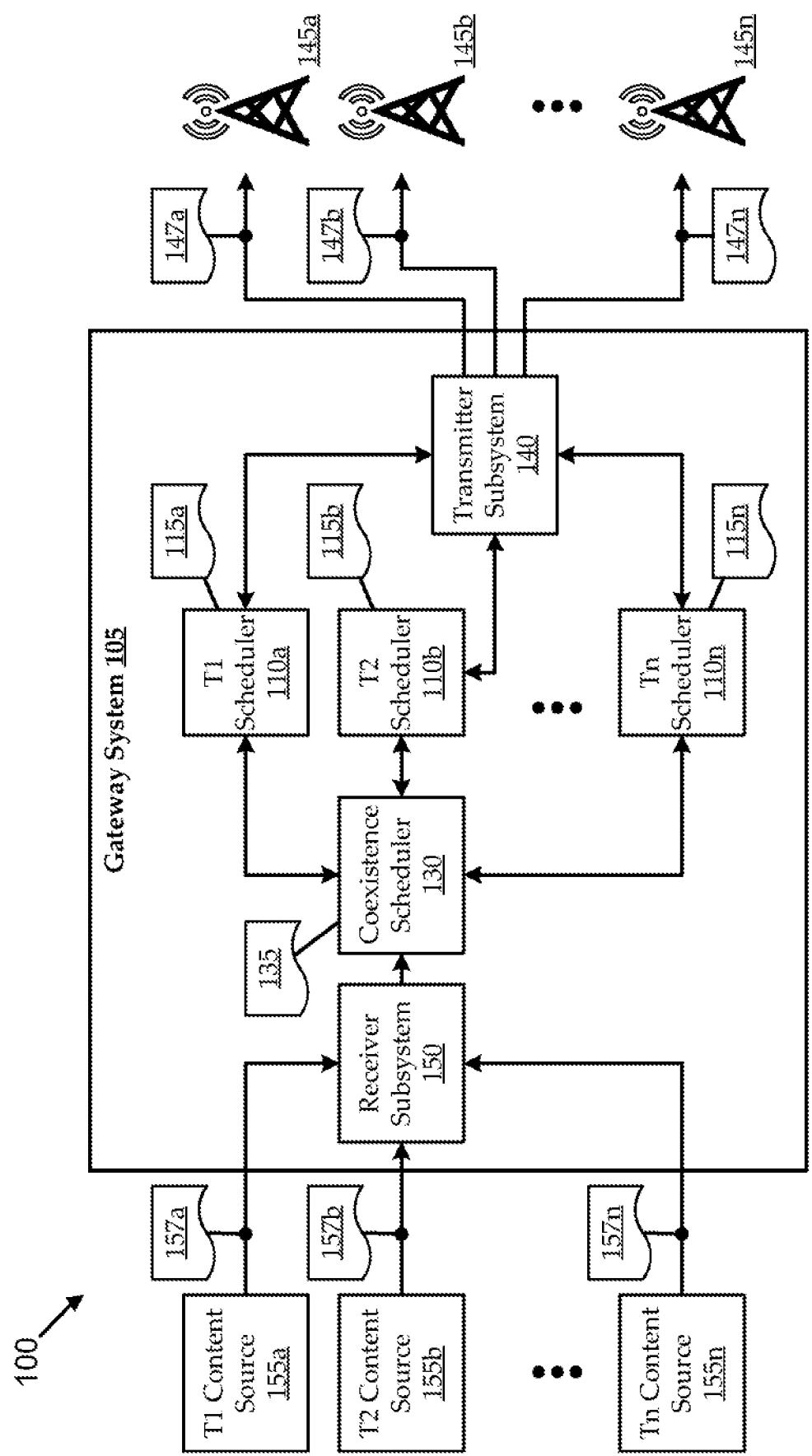
FIG. 1 shows a communications environment to enable concurrent communications by multiple networks using different radio technologies over a shared carrier, according to various embodiments.

Turning to FIG. 1, a communications environment 100 is shown to enable concurrent communications by multiple networks using different radio technologies over a shared carrier, according to various embodiments. Wireless spectrum is a limited resource, with many competing demands on the resource. Spectrum management techniques are carefully applied to facilitate concurrent use of the spectrum by many entities while limiting interference between those uses. However, constant innovations in spectrum management have been needed to keep up with ever-increasing demands for spectrum (e.g., for bandwidth).

Generally, different regions of the spectrum (e.g., frequency bands) are reserved for particular uses. For example, a particular region may be dedicated for higher power, longer range, higher bandwidth types of communications, such as broadcast digital television and high-speed Internet media streaming; another region may be dedicated for lower power, shorter range, lower bandwidth types of communications, such as radiofrequency identification; and another region may be dedicated for lower power, shorter range, higher bandwidth types of communications, such as for broadband wireless local area networks (WLANs) built on wireless fidelity (WiFi), or the like. Such allocation of different bands to different uses can tend to help avoid interference and provide other benefits.

Typically, an entity can receive a license (e.g., by purchase at auction) to use one or more carrier frequencies in a particular band for a particular use. The entity can then set up a communication network around implementing a radio technology standard that suits the particular use. For example, a television company may purchase a license to use one or more carriers for broadcasting one or more television channels in accordance with a broadcast television radio technology, such as a technology promulgated by the National Television Systems Committee (NTSC) or the Advanced Television Systems Committee (ATSC). At the same time, an Internet service provider may use one or more nearby carriers (e.g., in the same frequency band) to implement a mobile wireless communications network using a different radio technology, such as a technology promulgated by the Third Generation Partnership Project (3GPP).

Entities tend to build out different networks for different uses. Different radio technologies tend to have different transmission characteristics (e.g., defined by their standard setting organizations) to provide benefits, such as optimizing spectrum resources for the particular use or uses associated with that radio technology. For example, each radio technology standard can define modulating and/or coding schemes, bandwidth requirements, schemes for dividing a carrier into sub-carriers, schemes for using time slots, etc. As such, building a communication network for a licensed use tends to involve configuring encoding and decoding equipment to operate with the transmission characteristics of the particular radio technology standard, as well as configuring transmission and reception equipment for communication at particular power levels and carrier frequencies in accordance with the license.

Conventionally, broadcast television licenses have been granted to certain entities at certain carriers frequencies, while mobile wireless network licenses have been granted to other entities at other carrier frequencies. However, recent technological convergences are creating new opportunities for entities and new challenges for spectrum management. For example, television broadcasters have begun communicating over-the-air digital broadcast television in accordance with the ATSC 3.0 radio technology standard. Under ATSC 3.0, television channels can be broadcast using the same frequency bands as those being used for mobile communications, such as under 3GPP. Such convergences can create new opportunities for entities, but also create new challenges for spectrum management and network design.

Embodiments described herein enable coexistence of multiple radio technologies in a shared frequency band. For example, embodiments enable multiple radiofrequency networks using different radio technologies to coexist on a same carrier frequency by exploiting various frequency- and/or time-domain sharing of scheduled resources. As illustrated, the environment 100 can include various content sources 155 in communication with various wireless radio networks 145 via a gateway system 105, each wireless radio network 145 operating according to a particular radio technology (e.g., ATSC 3.0, 3GPP, etc.). Each content source 155 can be associated with a particular one of the wireless radio networks 145. Within the gateway system 105, a receiver subsystem 150 can receive data signals 157 from the content sources 155 and can pass each data signal 157 to a respective radio-technology-specific scheduler 110 that is configured for the particular radio technology of the associated wireless radio network 145. Such passing can involve passing each data signal 157 directly to its respective radio-technology-specific scheduler 110 and then to a coexistence scheduler 130, or passing each data signal 157 to its respective radio-technology-specific scheduler 110 via the coexistence scheduler 130. The radio-technology-specific schedulers 110 can communicate with a coexistence scheduler 130 to generate a coexistence resource schedule 135. Each radio-technology-specific scheduler 110 can then generate a respective radio signal 147 from the respective data signal 157 in accordance with the coexistence resource schedule 135 and the particular radio technology of the associated wireless radio network 145. Each radio signal 147 can then be transmitted by a transmitter subsystem 140 via its associated wireless radio network 145.

Embodiments of the receiver subsystem 150 can receive multiple data signals 157, such as a first data signal 157a for communication via a first radio technology and can receive a second data signal 157b for communication via a second radio technology. As used herein, each "radio technology" corresponds to at least a transmission standard that defines a respective communication resource grid 115. Each communication resource grid 115 can be composed of a sub-carrier definition and a timeslot definition. Accordingly, when a radio signal 147 is communicated in accordance with a particular radio technology at a particular carrier frequency (e.g., corresponding to a broadcast television channel, or the like), the communication resource grid 115 defines how the carrier will be divided into sub-carriers and/or how a broadcast timeframe will be divided into timeslots. Some radio technologies can permit only a single sub-carrier definition and a single timeslot definition, while other radio technologies can permit multiple sub-carrier definitions and/or multiple timeslot definitions. For example, a particular radio technology may permit a carrier to be divided optionally into 8,000, 16,000, or 32,000 sub-carriers. The communication resource grids 115 can be configured to support such options.

Some embodiments described herein operate in context of orthogonal frequency-division multiplexing (OFDM) radio technologies and corresponding communication resource grids 115 (e.g., including orthogonal frequency-division multiple access (OFDMA) technologies, and other variations thereof). In OFDM technologies, communication resources can be allocated across both frequency and time dimensions. In the frequency dimension, OFDM technologies encode digital data signals 157 into sub-carriers according to a sub-carrier definition in which each sub-carrier is orthogonal to its adjacent neighbors. In the time dimension, OFDM technologies can encode data into orthogonal timeslots. Implementations of OFDM technologies can use the same or different sub-carrier assignments across different timeslots, thereby implementing frequency-division multiplexing, time-division multiplexing, or frequency- and time-division multiplexing. In some embodiments, at least one of the radio technologies is a digital broadcast television technology, such as according to Advanced Television Systems Committee (ATSC) standards. In some embodiments, at least one of the radio technologies is a mobile wireless Internet technology, such as according to Third Generation Partnership Project (3GPP) standards.

For example, the first data signal 157a is intended for transmission via a 6 Megahertz carrier of a first wireless radio network 145a. In the first wireless radio network 145a, the carrier is configured as an ATSC 3.0 broadcast television channel, such that the data signal 157a is to be encoded into a first radio signal 147a in accordance with a first communication resource grid 115a defined by the ATSC 3.0 standard. The second data signal 157b is intended for transmission via the same 6 Megahertz carrier of a second wireless radio network 145b. In the second wireless radio network 145b, the carrier is configured as a 3GPP Internet-of-things (IoT) channel, such that the data signal 157b is to be encoded into a second radio signal 147b in accordance with a second communication resource grid 115b defined by the 3GPP standard. In this example case, the first wireless radio network 145a is a transmission-only (broadcast) network, while the second wireless radio network 145b is a bi-directional network. In other cases, however, any or all of the multiple wireless radio networks 145 can be one-directional, bi-directional, download-heavy (e.g., networks used for streaming of Internet media), upload-heavy (e.g., some IoT sensor networks), wide-band networks, narrow-band networks, etc.; so long as at least some of the wireless radio networks 145 could not coexist on a single carrier without the novel techniques described herein.

Embodiments of the receiver subsystem 150 receive the data signals 157 (e.g., as digital data streams) from one or more content sources 155. The receiver subsystem 150 includes any suitable hardware and/or software to facilitate receipt of the multiple data signals 157 from the multiple content sources 155. For example the receiver subsystem 150 is in communication with the one or more content sources 155 via any suitable wired and/or wireless communication links, and the receiver subsystem 150 includes any suitable physical and/or logical ports, antennas, filters, amplifiers, protocol-enabling components, etc. In some embodiments, the gateway system 105 is a single node in communication with multiple content sources 155, such as via one or more dedicated networks, backhaul networks, local networks, etc. For example, the gateway system 105 is a node of a television broadcast network that is coupled with a broadcast television content source, and the gateway system 105 is also coupled with an Internet backbone network. In other embodiments, the gateway system 105 is distributed among multiple nodes of one or more networks with a high-precision synchronization between the multiple nodes.

The receiver subsystem 150 can route the received data signals 157 to corresponding radio-technology-specific schedulers 110. In some embodiments, such routing is facilitated by data embedded into the data signals 157. For example, each data signal 157 can include metadata, tags, data structures, preambles, packet formats, or other information that explicitly or implicitly indicates to the receiver subsystem 150 which radio-technology-specific scheduler 110 to use for that data signal 157. In other embodiments, such routing is facilitated by tracking the data signals 157. For example, the routing can be based on the content source 155 from which a data signal 157 was received, a port (logical or physical) of the receiver subsystem 150 at which the data signal 157 was received, etc.

Each radio-technology-specific scheduler 110 can be associated with one or more communication resource grids 115 for a particular radio technology. For example, ATSC 3.0 data can be routed by the receiver subsystem 150 to a radio-technology-specific scheduler 110 configured for scheduling in accordance with a communication resource grid 115 configured for ATSC 3.0 networks. The communication resource grids 115 can be stored by the associated radio-technology-specific schedulers 110, and/or can be accessible to the radio-technology-specific schedulers 110 in any suitable manner. For example, each radio-technology-specific scheduler 110 can be in communication with a local or remote data store having the communication resource grids 115 stored thereon. Each radio-technology-specific scheduler 110 can be coupled with the coexistence scheduler 130 and with the transmitter subsystem 140.

Embodiments of the coexistence scheduler 130 compute a coexistence resource schedule 135 from the communication resource grids 115 of the radio-technology-specific scheduler 110. Computing the coexistence resource schedule 135 can involve computing a division of transmission resources into a plurality of sub-carriers of a carrier frequency according to a coexistence sub-carrier definition and into a plurality of timeslots according to a coexistence timeslot definition. The computation seeks to generate the coexistence sub-carrier definition to support the sub-carrier definitions of the various communication resource grids 115 for which coexistence is desired, and to generate the coexistence timeslot definition to support the timeslot definitions of the various communication resource grids 115 for which coexistence is desired. In some embodiments, the coexistence scheduler 130 can receive, from the receiver subsystem 150 and/or from each of multiple radio-technology-specific schedulers 110, a sub-carrier size (or a set of options for the sub-carrier size) according to the respective sub-carrier definition and/or a timeslot size (or a set of options for the timeslot size) according to the respective timeslot definition. The coexistence scheduler 130 can determine whether there are any differences among the sub-carrier sizes and/or timeslot sizes from the different radio technologies. If so, the coexistence scheduler 130 can compute a sub-carrier size and/or timeslot size that is compatible for all the radio technologies for which coexistence is desired. For example, the coexistence scheduler 130 can compute the coexistence sub-carrier size to be a common multiple (e.g., the least common multiple) of the sub-carrier sizes of the different radio technologies, and/or the coexistence scheduler 130 can compute the coexistence timeslot size to be a common multiple (e.g., the least common multiple) of the timeslot sizes of the different radio technologies. As another example, where each of the multiple radio technologies identifies a list of multiple supported sub-carrier sizes (and/or timeslot sizes), the coexistence scheduler 130 can compute the coexistence sub-carrier size (and/or coexistence timeslot size) as one of multiple sub-carrier sizes (and/or timeslot sizes) that is listed as supported by all the radio technologies for which coexistence is desired.

Having defined an appropriate coexistence sub-carrier definition and coexistence timeslot definition, the coexistence scheduler 130 can further define the coexistence resource schedule 135 as a paradigm in which to encode the multiple data signals 157 coextensively across the sub-carriers and timeslots. In some embodiments, such defining can be fully static. In some such embodiments, bandwidth requirements of the data signals 157 for the coexisting radio technologies can be generally known and fixed a priori; such that the coexistence scheduler 130 can compute and maintain a static coexistence resource schedule 135 to have an optimized allocation of communication resources across the different radio technologies in accordance with their respective bandwidth requirements. In other embodiments, such defining can be opportunistic. In some such embodiments, bandwidth requirements of a subset of the data signals 157 can be detected as the corresponding data signals 157 are received, and the coexistence scheduler 130 can allocate remaining resources opportunistically to one or more other of the radio technologies. In other embodiments, such defining can combine static, dynamic, and/or opportunistic scheduling. For example, a certain amount of communication resources (e.g., sub-carriers and/or timeslots) is reserved for a first radio technology, a second amount of communication resources is dynamically allocated to ensure sufficient resource availability for a second radio technology, and any remaining communication resources are opportunistically allocated to one or more other radio technologies. As described herein, the various types of resource allocations of the coexistence resource schedule 135 can involve allocation of sub-carriers (e.g., as a frequency-division multiplexing implementation) and/or allocation of timeslots (e.g., as a time-division multiplexing implementation).

In some embodiments, each radio-technology-specific schedulers 110 can use the coexistence resource schedule 135 to encode its respective data signal 157 into a respective radio signal 147 in accordance with its respective radio technology (and corresponding communication resource grid 115). For example, a first radio-technology-specific scheduler 110a, coupled with the receiver subsystem 150 and the coexistence scheduler 130 and having the first communication resource grid 115a stored in communication therewith, generates a first radio signal 147a by scheduling the first data signal 157a to consume a first subset of the sub-carriers of the coexistence sub-carrier definition and a first subset of the timeslots of the coexistence timeslot definition in accordance with the first radio technology. A second radio-technology-specific scheduler 110b, coupled with the receiver subsystem 150 and the coexistence scheduler 130 and having the second communication resource grid 115b stored in communication therewith, generates a second radio signal 147b by scheduling the second data signal 157b to consume a second subset of the sub-carriers of the coexistence sub-carrier definition and a second subset of the timeslots of the coexistence timeslot definition in accordance with the second radio technology. In some implementations, the second radio-technology-specific scheduler 110b performs its scheduling by scheduling at least a portion of the second data signal 157b to consume the second subset of the sub-carriers and the second subset of the timeslots of a remaining portion of the coexistence resources subsequent to the scheduling of the first data signal 157a by the first radio-technology-specific scheduler 110a (e.g., the second scheduling is dynamic and/or opportunistic). Depending on the coexistence resource schedule 135, the first and second subsets of the sub-carriers can include the same or different sub-carriers, and/or the first and second subsets of the timeslots can include the same or different timeslots. The generation of the radio signals 147 by the radio-technology-specific schedulers 110 can involve any suitable techniques for assigning particular data to particular sub-carriers and timeslots. For example, the radio-technology-specific schedulers 110 can use the coexistence resource schedule 135 as a mask to effectively blank out encoding of its respective data signal 157 in any sub-carriers and/or timeslots where overlap would otherwise occur.

For the sake of illustration, suppose a data signal is being conventionally encoded into an OFDM radio signal, and suppose the OFDM resource grid is defined to have 1000 sub-carriers and 1000 timeslots. A conventional scheduler receives a packet of the data signal, slices the packet into small chunks, fills the sub-carriers sequentially with the chunks, and transmits. Ideally, all the sub-carriers would always be filled with data from the data stream in all timeslots. However, this is typically not the case. For example, ATSC 3.0 uses adaptive coding techniques, and other OFDM technologies can employ other types of adaptive and/or dynamic encoding, which can result in the data signals consuming a changing amount of bandwidth at different times. If the size of the received packet consumes, say, 2700 sub-carriers, the conventional scheduler may fill 2 full timeslot columns (of 1000 sub-carriers each) and a partial third timeslot column (with the remaining 700 subcarriers-worth of data). When transmitted, there will be 300 sub-carriers left over, which is effectively wastage of the communication resources. To implement the coding (i.e., to allow the encoding mathematics to function properly), such conventional schedulers tend to fill those 300 remaining sub-carriers with junk data. In some cases, so-called statistical multiplexing ("stat-muxing"), or other techniques are used to minimize the number of carriers that get filled with junk data. However, even such techniques do not tend to eliminate the junk data completely, and still result in wastage.

According to the embodiments described herein, some or all of the wastage can be filled with data from coexisting radio technologies. Referring to the preceding example, suppose the above data signal is an ATSC 3.0 packet, and a small wireless fidelity (WiFi) packet is received at substantially the same time that consumes only 250 sub-carriers-worth of resources. Instead of filling the remaining 300 sub-carriers with junk data, 250 of the 300 sub-carriers can be filled with data from the WiFi packet, leaving only 50 sub-carriers to fill with junk data. As a related example, suppose the WiFi packet consumes 1,200 sub-carriers-worth of resources. Instead of filling the remaining 300 sub-carriers with junk data, the rest of that timeslot column plus 900 sub-carriers in the next timeslot column can be filled with the WiFi data, leaving only 100 sub-carriers to fill with junk data.

Having generated the radio signals 147 in accordance with the coexisting radio technologies, the radio signal 147 can be passed to the transmitter subsystem 140. The transmitter subsystem 140 can transmit the radio signals 147 wirelessly via the carrier over the multiple wireless radio networks 145. For example, the transmitter subsystem 140 includes at least one radiofrequency antenna. In some embodiments, the multiple wireless radio networks 145 are physically separate network infrastructures. For example, each wireless radio network 145 has its own transmitters, receivers, and intermediate nodes (e.g., towers, etc.). Such an implementation can be useful, for example, where the different radio technologies are being used to implement networks with appreciably different characteristics (e.g., with appreciably different bandwidth, different transmission power, different uplink/downlink distribution, etc.). In other embodiments, some or all of the multiple wireless radio networks 145 utilize a shared network infrastructure. For example, the radio signals 147 can be communicated between the same receivers and transmitters, but the received radio signals 147 are decided using decoders configured for the particular radio technology. Such an implementation can be useful, for example, where the different radio technologies are being used for similar purposes (e.g., one radio technology is being used for digital broadcast media, and another is being used for digital streaming Internet media). In these or other embodiments, because the multiple radio technologies are being encoded into a common carrier on orthogonal sub-carriers and/or timeslots, a single technology-agnostic receiver can be used for both radio technologies. For example, the multiple radio signals 147 can be received by a single software-defined radio and separately decoded.

Figure 2:
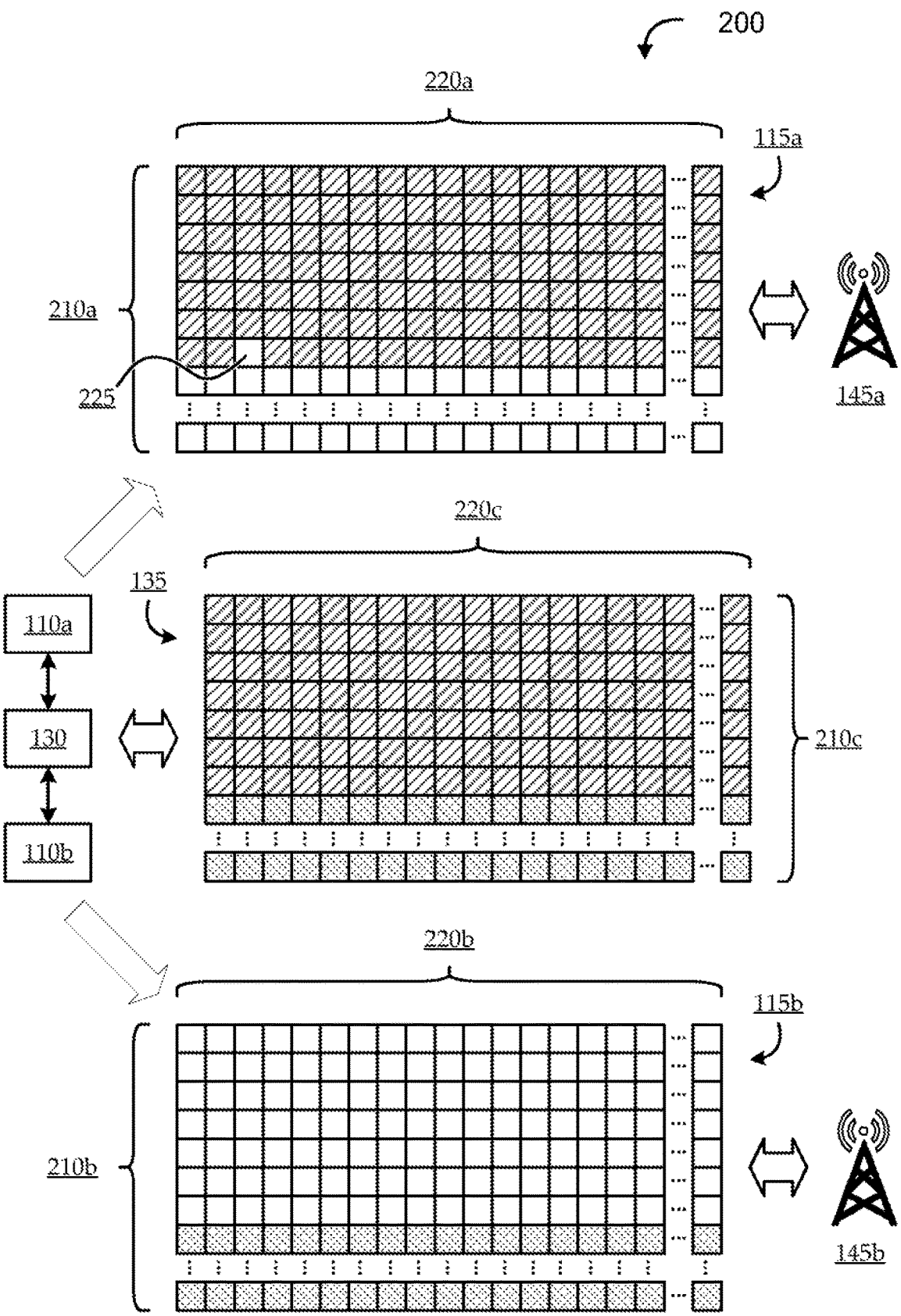
FIG. 2 shows a first illustrative implementation environment of coexistence resource scheduling that exploits frequency-division multiplexing, according to various embodiments.
Figure 3:
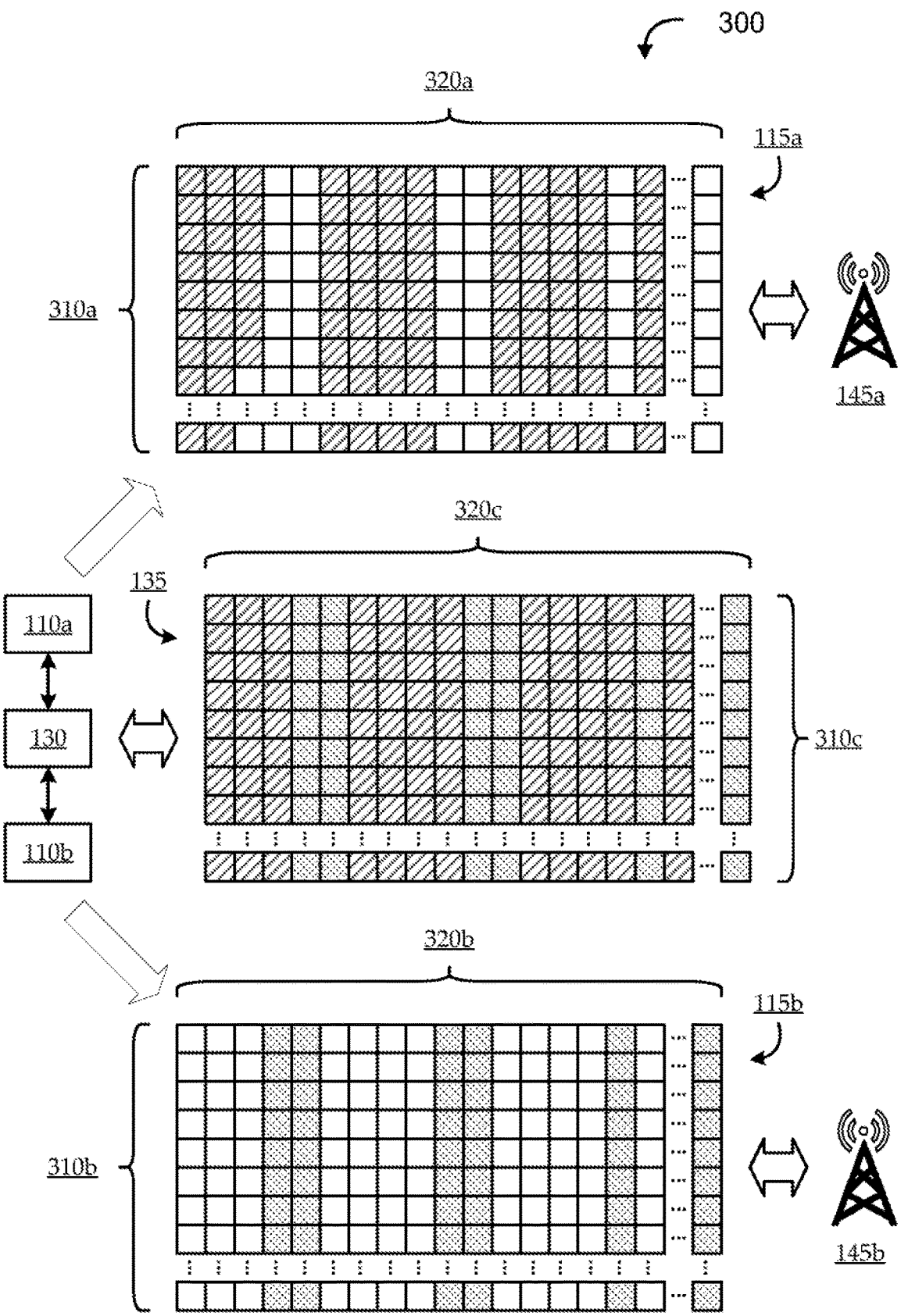
FIG. 3 shows a second illustrative implementation environment of coexistence resource scheduling that exploits time-division multiplexing, according to various embodiments.
Figure 4:
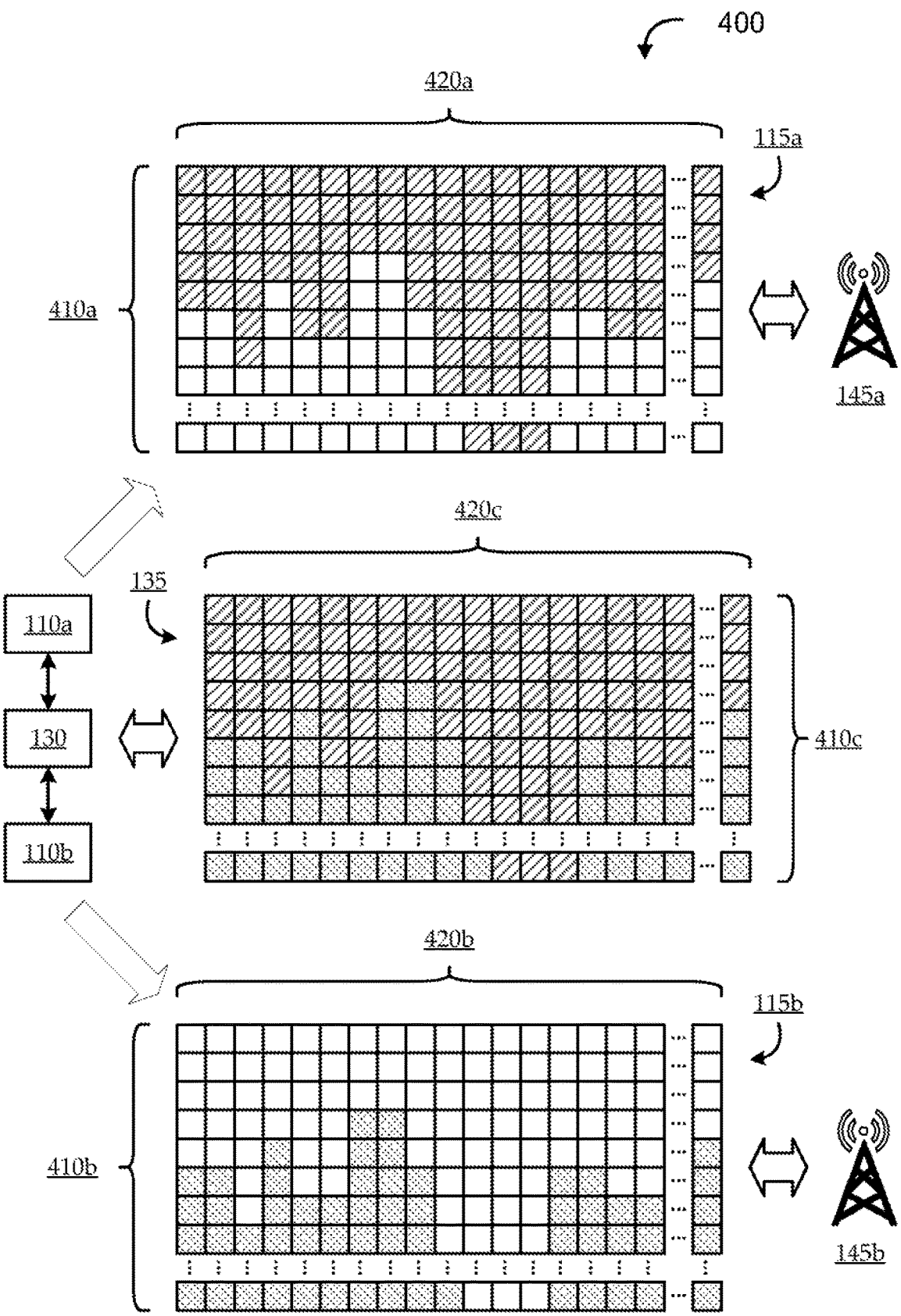
FIG. 4 shows a third illustrative implementation environment of coexistence resource scheduling that exploits frequency- and time-division multiplexing, according to various embodiments.

FIGS. 2-4 show illustrative implementations of coexistence resource scheduling that exploit frequency- and/or time-division multiplexing. FIG. 2 shows a first illustrative implementation environment 200 of coexistence resource scheduling that exploits frequency-division multiplexing, according to various embodiments. The illustrated environment 200 includes a number of components described with reference to FIG. 1, including the coexistence scheduler 130 in communication with a first radio-technology-specific scheduler 110a and a second radio-technology-specific scheduler 110b. While only two radio-technology-specific schedulers 110 are shown, other implementations can include more than two radio-technology-specific schedulers 110. Each radio-technology-specific scheduler 110 has an associated communication resource grid 115, which includes a respective set of sub-carrier rows 210 and timeslot columns 220 defined in accordance with respective sub-carrier definitions and respective timeslot definitions (e.g., defined by standards for the associated radio technologies). The coexistence scheduler 130 is illustrated as computing a coexistence resource schedule 135, which is also illustrated as a coexistence resource grid having coexistence sub-carrier rows 210c and coexistence timeslot columns 220c. In the illustrated scenario, the communication resource grids 115 of the two radio technologies have the same sub-carrier and timeslot sizes, such that the coexistence resource grid can similarly have the same sub-carrier and timeslot sizes. As described herein, however, there can be scenarios in which the communication resource grids 115 of the two radio technologies have different sub-carrier and/or timeslot sizes, such that computing the coexistence resource grid can involve determining appropriate sizes for the coexistence sub-carriers and coexistence timeslots.

The coexistence scheduler 130 can divide the communication resources for allocation among the radio technologies by allocating a first subset of the coexistence sub-carrier rows 210c in each coexistence timeslot column 220c to the first radio technology, and allocating a second (e.g., remaining) subset of the coexistence sub-carrier rows 210c in each coexistence timeslot column 220c to the second radio technology. In some embodiments, the coexistence scheduler 130 can have a known bandwidth allocation for the first radio technology. In one such embodiment, the first radio-technology-specific scheduler 110a has advanced knowledge (e.g., by a few seconds), or a prediction, of an amount of bandwidth needed to transmit its data signals 157, and the radio-technology-specific scheduler 110a informs the coexistence scheduler 130 of the known or predicted upcoming bandwidth. In another such embodiment, the first radio technology is associated with a fixed bandwidth, such as a guaranteed throughput. In some embodiments, the number of coexistence sub-carrier rows 210c allocated to the second radio technology is whatever remains after allocating to the first radio technology. In other embodiments, the number of coexistence sub-carrier rows 210c allocated to the second radio technology is also computed. One such embodiment uses an algorithm to ensure that, over a time window, at least a first amount of sub-carrier bandwidth is allocated to the first radio technology and at least a second amount of sub-carrier bandwidth is allocated to the second radio technology, even if more or less is allocated during portions of the time window. Another such embodiment uses an algorithm to ensure fairness over a time window, such that substantially equal amounts of sub-carrier bandwidth are allocated to both radio technologies, even if more or less is allocated during portions of the time window. In the illustrated scenario, appreciably more of the coexistence sub-carrier rows 210c are allocated to the first radio technology in each coexistence timeslot column 220c than are allocated to the second radio technology. For example, such a scenario can represent a high-definition digital broadcast television network (e.g., based on ATSC 3.0) having relatively high bandwidth needs coexisting with an IoT network (e.g., based on 3GPP) having relatively low bandwidth needs (e.g., particularly in the downlink direction).

In some cases, the actual bandwidth requirements of one or both radio technologies may not fill what is allocated, predicted, etc. For example, as illustrated, the same number of coexistence sub-carrier rows 210c is assigned to the first radio technology in each coexistence timeslot column 220c. However, when the first radio-technology-specific scheduler 110a encodes its data signal 157a, the third timeslot of its communication resource grid 115a is only partially filled, leaving a remaining sub-carrier 225. In some implementations, in such a scenario, the radio-technology-specific scheduler 110a would fill the remaining sub-carrier 225 with junk data. As such, there can still be some wastage in some cases.

After the coexistence scheduler 130 has computed the coexistence resource schedule 135, the communication resource assignments (e.g., the coexistence sub-carrier rows 210c and coexistence timeslot columns 220c) can be passed to the radio-technology-specific schedulers 110. The first radio-technology-specific scheduler 110a can generate its radio signal 147a by encoding its data signal 157a in accordance with its allocated coexistence sub-carrier rows 210c in each timeslot, and further in accordance with its own communication resource grid 115a, as needed. The second radio-technology-specific scheduler 110b can similarly generate its radio signal 147b by encoding its data signal 157b in accordance with its allocated coexistence sub-carrier rows 210c in each timeslot, and further in accordance with its own communication resource grid 115b, as needed. The radio-technology-specific schedulers 110 can also apply any other coding, modulation, etc. in accordance with its associated radio technology. The radio signals 147 can be sent to the transmitter subsystem 140 (not shown) for communication via the respective wireless radio networks 145. In some cases, the transmitter subsystem 140 further configures the radio signals 147 for transmission, for example, by applying filtering, amplification, additional modulation and/or coding, etc. When the radio signals 147 are transmitted, the first and second radio technologies coexist in the same carrier by using orthogonal sets of sub-carriers. In this way, the radio signals 147 for multiple wireless radio networks 145 (with the same or different physical infrastructure can be transmitted effectively as a single OFDM transmission on a single carrier.

FIG. 3 shows a second illustrative implementation environment 300 of coexistence resource scheduling that exploits time-division multiplexing, according to various embodiments. The illustrated environment 300 is similar to the environment 200 described with reference to FIG. 2, and embodiments, implementations, and variations described with reference to FIG. 2 can generally be applied to the environment 300 of FIG. 3 with modification from frequency-division to time-division. As such, for the sake of expediency, the description of FIG. 3 focuses on the differences between environment 300 and environment 200. In particular, the coexistence scheduler 130 in FIG. 3 can divide the communication resources for allocation among the radio technologies by allocating all of the coexistence sub-carrier rows 310c in each of a first subset of coexistence timeslot columns 320c to the first radio technology, and allocating all the coexistence sub-carrier rows 310c in each of a second (e.g., remaining) subset coexistence timeslot column 320c to the second radio technology. As described above, such division can be based on known and/or pre-dicted bandwidth allocations, static and/or dynamic allocations, algorithms seeking particular goals (e.g., on average) over time, etc.

After the coexistence scheduler 130 has computed the coexistence resource schedule 135, the communication resource assignments (e.g., the coexistence sub-carrier rows 310c and coexistence timeslot columns 320c) can be passed to the radio-technology-specific schedulers 110. The first radio-technology-specific scheduler 110a can generate its radio signal 147a by encoding its data signal 157a in accordance with its allocated coexistence timeslot columns 320c, and further in accordance with its own communication resource grid 115a, as needed. The second radio-technology-specific scheduler 110b can similarly generate its radio signal 147b by encoding its data signal 157b in accordance with its allocated coexistence timeslot columns 320c, and further in accordance with its own communication resource grid 115b, as needed. The radio-technology-specific schedulers 110 and/or transmitter subsystem 140 can apply any other coding, modulation, filtering, amplification, etc. to prepare the radio signals 147 for transmission over the wireless radio networks 145. When the radio signals 147 are transmitted, the first and second radio technologies coexist in the same carrier by using orthogonal sets of timeslots. In this way, the radio signals 147 for multiple wireless radio networks 145 (with the same or different physical infrastructure) can be transmitted effectively as a single OFDM transmission on a single carrier.

FIG. 4 shows a third illustrative implementation environment 400 of coexistence resource scheduling that exploits frequency- and time-division multiplexing, according to various embodiments. The illustrated environment 400 is similar to the environments 200 and 300 described with reference to FIGS. 2 and 3, and embodiments, implementations, and variations described with reference to FIGS. 2 and 3 can generally be applied to the environment 400 of FIG. 4 with modification for both frequency-division and time-division. As such, for the sake of expediency, the description of FIG. 4 focuses on the differences between environment 400 and environments 200 and 300. In particular, the coexistence scheduler 130 in FIG. 4 can divide the communication resources for allocation among the radio technologies by allocating different subsets of the coexistence sub-carrier rows 410c in each coexistence timeslot column 420c to the first radio technology, and allocating other subsets of the coexistence sub-carrier rows 410c in each coexistence timeslot column 420c to the second radio technology.

Embodiments following the environment 400 of FIG. 4 can be used to implement opportunistic, or otherwise dynamic, allocation. In some such embodiments, the first radio-technology-specific scheduler 110a monitors bandwidth requirements of its incoming data signals 157. In one implementation, the first radio-technology-specific scheduler 110a monitors the incoming data signals 157 themselves to measure an amount of data to be encoded in accordance with its communication resource grid 115a. In another implementation, the first radio-technology-specific scheduler 110a receives additional signals from one or more content sources 155 to indicate an upcoming amount of data to be encoded in accordance with its communication resource grid 115a. In another implementation, the first radio-technology-specific scheduler 110a monitors characteristics of a communication link between the receiver subsystem 150 and one or more content sources 155 to determine a predicted amount of data to be encoded in accordance with its communication resource grid 115a. For example, the data signals 157 may be encoded using adaptive video encoding, adaptive bit rate encoding, or other forms of compression, which can indicate a change in bandwidth requirements for the incoming data signals 157.

The coexistence scheduler 130 can allocate appropriate portions of the coexistence resource schedule 135 in accordance with the advanced knowledge (or prediction) of bandwidth requirements for the first radio technology. As described above, wastage can be reduced and/or other features can be realized by allocating according to frequency-division or time-division schemes, such as in FIGS. 2 and 3. In some cases, configuring the coexistence scheduler 130 to allocate (to compute the coexistence resource schedule 135) according to both frequency-division and time-division schemes can further reduce wastage and/or realize other features.

For example, suppose each coexistence timeslot column 220c of the coexistence resource schedule 135 is divided into 1000 coexistence sub-carrier rows 210c. A series of packets of data for the first radio technology (Packets 1-4) are determined to consume 800, 570, 400, and 500 sub-carriers, respectively, and a series of packets of data for the second radio technology (Packets 5-8) are determined to consume 200, 420, 580, and 500 sub-carriers, respectively. Suppose an implementation of the frequency-division scheme of FIG. 2 allocates 80 percent of the sub-carriers to the first radio technology. Regarding the first radio technology: Packet 1 can thus consume 800 sub-carriers (all) in timeslot 1; Packet 2 can consume 570 sub-carriers in timeslot 2 (leaving 270 wasted sub-carriers); Packet 3 can consume 400 sub-carriers in timeslot 3 (leaving 400 wasted sub-carriers); and Packet 4 can consume 500 sub-carriers in timeslot 4 (leaving 300 wasted sub-carriers). Regarding the second radio technology: Packet 5 can thus consume the remaining 200 sub-carriers (all) in timeslot 1; and Packet 6 can consume all sub-carriers in timeslots 2 and 3, and 20 of the sub-carriers in timeslot 4 (leaving an additional 180 wasted sub-carriers). Some implementations may be able to schedule Packet 7, instead of Packet 6 (out of order), thereby consuming all sub-carriers in timeslots 2 and 3, and 180 of the sub-carriers in timeslot 4 (leaving only an additional 20 wasted sub-carriers).

Implementing the same example in an illustrative time-division scheme of FIG. 3 can involve allocating 75 percent of the timeslots to the first radio technology (e.g., three timeslots to the first radio technology, followed by one timeslot to the second radio technology). Regarding the first radio technology: Packet 1 can thus consume 800 sub-carriers in timeslot 1 (leaving 200 wasted sub-carriers); Packets 2 and 3 can together consume 970 sub-carriers in timeslot 2 (leaving 30 wasted sub-carriers); and Packet 4 can consume 500 sub-carriers in timeslot 3 (leaving 500 wasted sub-carriers). Regarding the second radio technology: Packets 5 and 6 can together consume 620 sub-carriers of timeslot 4 (leaving an additional 380 wasted sub-carriers). Some implementations may be able to schedule Packets 6 and 7, instead of Packets 5 and 6 (out of order), thereby consuming all 1000 sub-carriers in timeslot 4.

Implementing the same example in an illustrative frequency- and time-division scheme of FIG. 4 can involve allocating the timeslots as follows: timeslot 1 is divided into 800 sub-carriers for the first radio technology and 200 sub-carriers for the second radio technology; timeslot 2 is divided into 1000 sub-carriers for the first radio technology and no sub-carriers for the second radio technology; timeslot 3 is divided into 1000 sub-carriers for the second radio technology and no sub-carriers for the first radio technology; and timeslot 4 is divided into 500 sub-carriers for the first radio technology and 500 sub-carriers for the second radio technology. Thus, Packet 1 (of the first radio technology) and Packet 5 (of the second radio technology) can be assigned to the first timeslot, thereby consuming all the sub-carriers in that timeslot by frequency-divided coexistence of the two radio technologies; Packets 2 and 3 (both of the first radio technology) can be assigned to the second timeslot, and Packets 6 and 7 (both of the second radio technology) can be assigned to the third timeslot, thereby consuming most of the sub-carriers in those timeslots by time-divided coexistence of the two radio technologies (leaving only 30 wasted sub-carriers in timeslot 2, and none in timeslot 3); and Packet 4 (of the first radio technology) and Packet 8 (of the second radio technology) can be assigned to the fourth timeslot, thereby consuming all the sub-carriers in that timeslot by frequency-divided coexistence of the two radio technologies.

As in FIGS. 2 and 3, after the coexistence scheduler 130 in FIG. 4 has computed the coexistence resource schedule 135, the communication resource assignments (e.g., the coexistence sub-carrier rows 410c and coexistence timeslot columns 420c) can be passed to the radio-technology-specific schedulers 110. The first radio-technology-specific scheduler 110a can generate its radio signal 147a by encoding its data signal 157a in accordance with its allocated coexistence sub-carrier rows 410c and coexistence timeslot columns 420c, and further in accordance with its own communication resource grid 115a, as needed. The second radio-technology-specific scheduler 110b can similarly generate its radio signal 147b by encoding its data signal 157b in accordance with its allocated coexistence sub-carrier rows 410c and coexistence timeslot columns 420c, and further in accordance with its own communication resource grid 115b, as needed. The radio-technology-specific schedulers 110 and/or transmitter subsystem 140 can apply any other coding, modulation, filtering, amplification, etc. to prepare the radio signals 147 for transmission over the wireless radio networks 145. When the radio signals 147 are transmitted, the first and second radio technologies coexist in the same carrier by using orthogonal sets of sub-carriers and timeslots. In this way, the radio signals 147 for multiple wireless radio networks 145 (with the same or different physical infrastructure) can be transmitted effectively as a single OFDM transmission on a single carrier.

Figure 5:
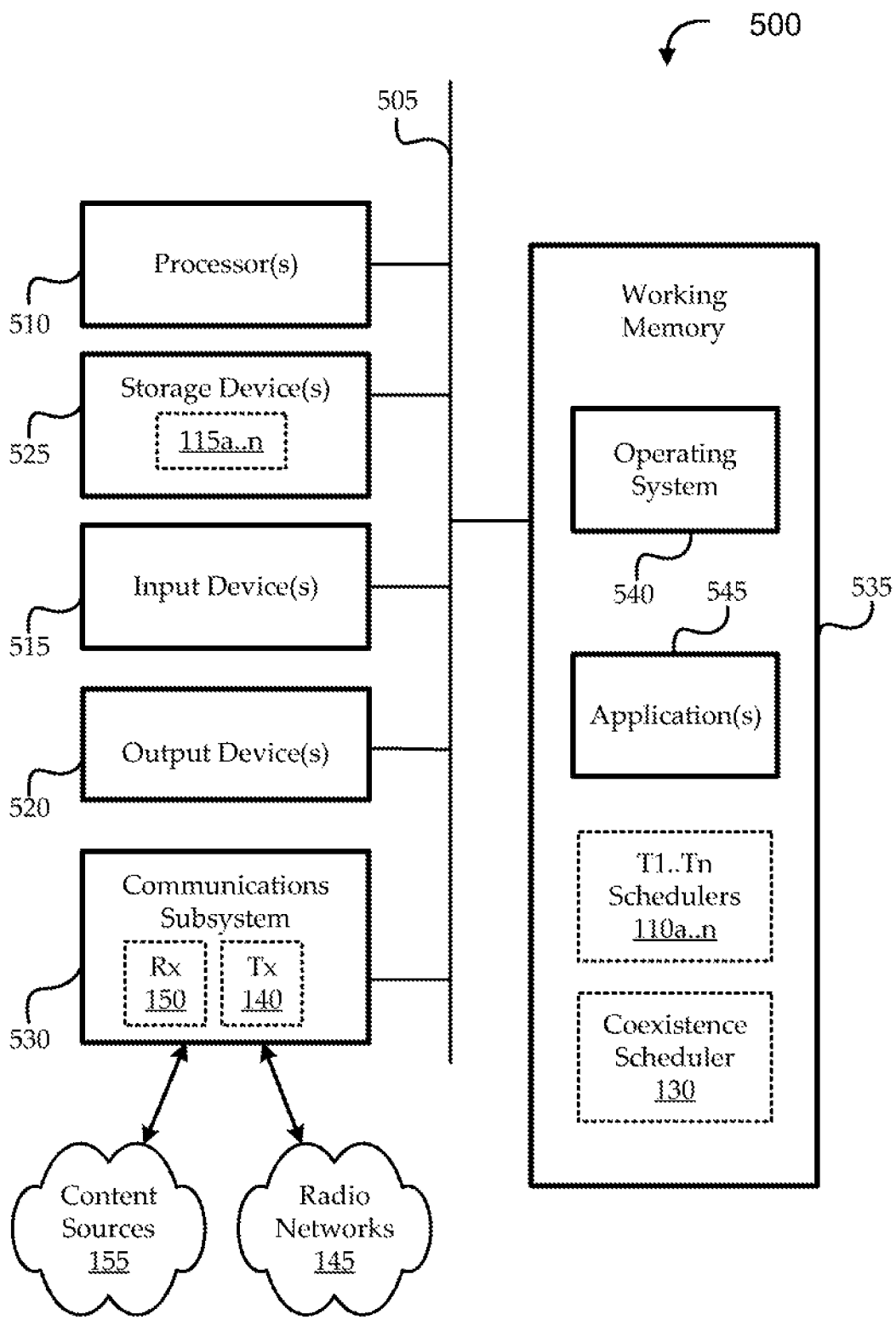
FIG. 5 provides a schematic illustration of embodiments of computer systems that can implement various system components and/or perform various steps of methods provided by various embodiments.

Embodiments of the gateway system 105, and or components thereof, can be implemented on, and/or can incorporate, one or more computer systems, as illustrated in FIG. 5. FIG. 5 provides a schematic illustration of embodiments of computer systems 500 that can implement various system components and/or perform various steps of methods provided by various embodiments. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown including hardware elements that can be electrically coupled via a bus 505 (or may otherwise be in communication, as appropriate). The hardware elements may include one or more processors 510, including, without limitation, one or more general-purpose processors and/or one or more special-purpose processors (such as digital signal processing chips, graphics acceleration processors, video decoders, and/or the like); one or more input devices 515, which can include, without limitation, a mouse, a keyboard, remote control, and/or the like;

and one or more output devices 520, which can include, without limitation, a display device, a printer, and/or the like. In some implementations, the computer system 500 is a server computer configured to interface with additional computers (not with human users), such that the input devices 515 and/or output devices 520 include various physical and/or logical interfaces (e.g., ports, etc.) to facilitate computer-to-computer interaction and control.

The computer system 500 may further include (and/or be in communication with) one or more non-transitory storage devices 525, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including, without limitation, various file systems, database structures, and/or the like.

The computer system 500 can also include a communications subsystem 530, which can include, without limitation, a modem, a network card (wireless or wired), an infrared communication device, a wireless communication device, and/or a chipset (such as a Bluetooth™ device, an 802.11 device, a WiFi device, a WiMax device, cellular communication device, etc.), and/or the like. The communications subsystem 530 may permit data to be exchanged with a network, other computer systems, and/or any other devices described herein.

In many embodiments, the computer system 500 will further include a working memory 535, which can include a RAM or ROM device, as described herein. The computer system 500 also can include software elements, shown as currently being located within the working memory 535, including an operating system 540, device drivers, executable libraries, and/or other code, such as one or more application programs 545, which may include computer programs provided by various embodiments, and/or may be designed to implement methods, and/or configure systems, provided by other embodiments, as described herein. Merely by way of example, one or more procedures described with respect to the method(s) discussed herein can be implemented as code and/or instructions executable by a computer (and/or a processor within a computer); in an aspect, then, such code and/or instructions can be used to configure and/or adapt a general purpose computer (or other device) to perform one or more operations in accordance with the described methods.

The computer system 500 is shown as implementing an illustrative gateway system 105. As illustrated, the communications subsystem 530 can include the receiver subsystem 150 and/or the transmitter subsystem 140. Accordingly, the communications subsystem 530 can be in communication (e.g., directly, via a network, etc.) with the content sources 155 and/or with the wireless radio networks 145. The working memory 535 can be used to implement embodiments of the radio-technology-specific schedulers 110, coexistence scheduler 130, and/or other components (e.g., including components of the receiver subsystem 150 and/or the transmitter subsystem 140). For example, each such component can be implemented as instructions, which, when executed, cause the processor(s) 510 to perform functions of those components. The storage devices 525 and/or working memory 535 can be used to store the coexistence resource schedule 135 and communication resource grids 115.

A set of these instructions and/or codes can be stored on a non-transitory computer-readable storage medium, such as the non-transitory storage device(s) 525 described above. In some cases, the storage medium can be incorporated within a computer system, such as computer system 500. In other embodiments, the storage medium can be separate from a computer system (e.g., a removable medium, such as a compact disc), and/or provided in an installation package, such that the storage medium can be used to program, configure, and/or adapt a general purpose computer with the instructions/code stored thereon. These instructions can take the form of executable code, which is executable by the computer system 500 and/or can take the form of source and/or installable code, which, upon compilation and/or installation on the computer system 500 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware can also be used, and/or particular elements can be implemented in hardware, software (including portable software, such as applets, etc.), or both. Further, connection to other computing devices, such as network input/output devices, may be employed.

As mentioned above, in one aspect, some embodiments may employ a computer system (such as the computer system 500) to perform methods in accordance with various embodiments of the invention. According to a set of embodiments, some or all of the procedures of such methods are performed by the computer system 500 in response to processor 510 executing one or more sequences of one or more instructions (which can be incorporated into the operating system 540 and/or other code, such as an application program 545) contained in the working memory 535. Such instructions may be read into the working memory 535 from another computer-readable medium, such as one or more of the non-transitory storage device(s) 525. Merely by way of example, execution of the sequences of instructions contained in the working memory 535 can cause the processor (s) 510 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 500, various computer-readable media can be involved in providing instructions/code to processor(s) 510 for execution and/or can be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 525. Volatile media include, without limitation, dynamic memory, such as the working memory 535.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 510 for execution. Merely by way of example, the instructions may initially be carried on a magnetic disk and/or optical disc of a remote computer. A remote computer can load the instructions into its dynamic memory and send the instructions as signals over a transmission medium to be received and/or executed by the computer system 500.

The communications subsystem 530 (and/or components thereof) generally will receive signals, and the bus 505 then can carry the signals (and/or the data, instructions, etc., carried by the signals) to the working memory 535, from which the processor(s) 510 retrieves and executes the instructions. The instructions received by the working memory 535 may optionally be stored on a non-transitory storage device 525 either before or after execution by the processor(s) 510.

It should further be understood that the components of computer system 500 can be distributed across a network. For example, some processing may be performed in one location using a first processor while other processing may be performed by another processor remote from the first processor. Other components of computer system 500 may be similarly distributed. As such, computer system 500 may be interpreted as a distributed computing system that performs processing in multiple locations. In some instances, computer system 500 may be interpreted as a single computing device, such as a distinct laptop, desktop computer, or the like, depending on the context.

Figure 6:
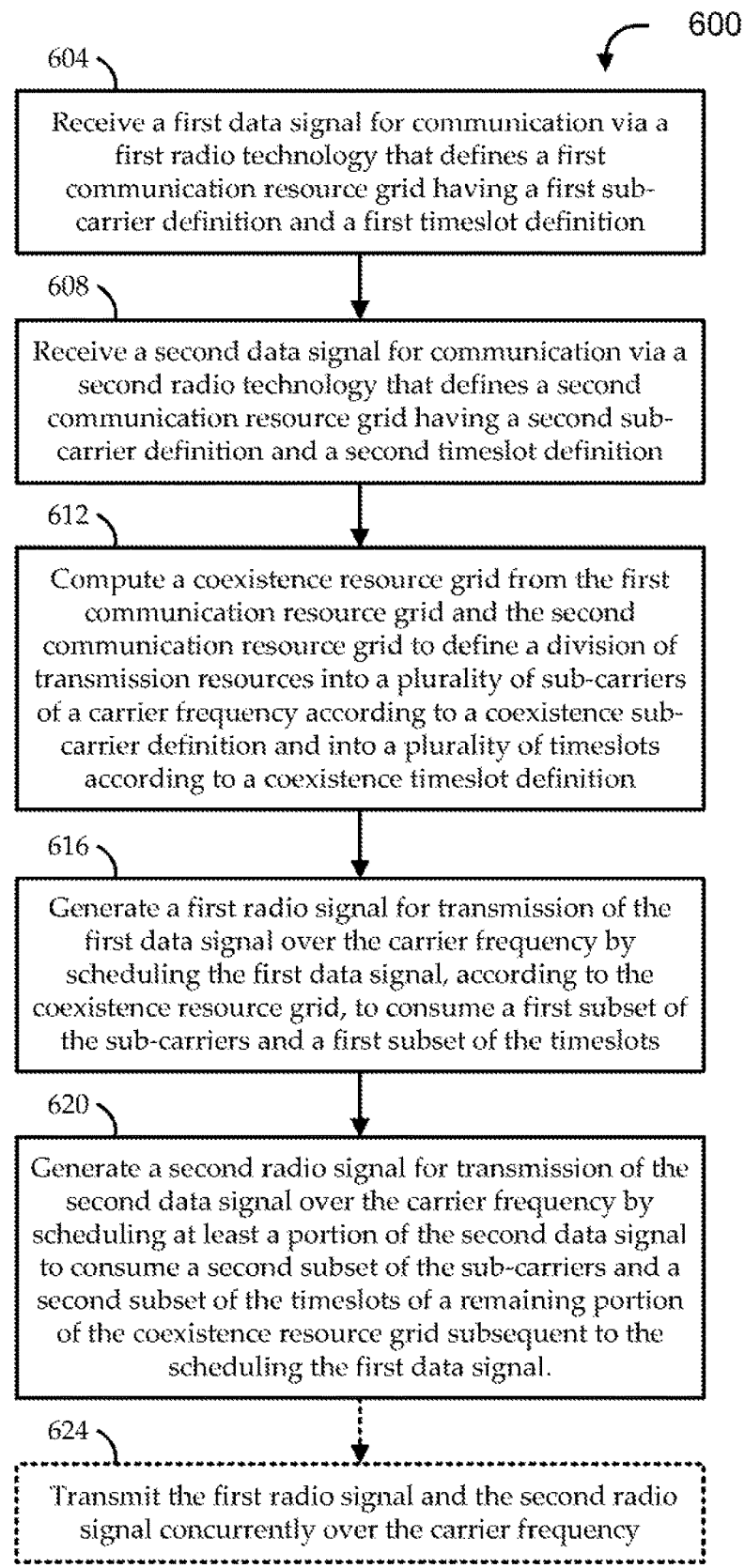
FIG. 6 shows a flow diagram of an illustrative method for coexistence of multiple radio technologies in a shared carrier, according to various embodiments.

Systems including those described above can be used to implement various methods. FIG. 6 shows a flow diagram of an illustrative method 600 for coexistence of multiple radio technologies in a shared carrier, according to various embodiments. Embodiments of the method 600 begin at stage 604 by receiving a first data signal for communication via a first radio technology that defines a first communication resource grid having a first sub-carrier definition and a first timeslot definition. At stage 608, embodiments can receive a second data signal for communication via a second radio technology that defines a second communication resource grid having a second sub-carrier definition and a second timeslot definition. In some embodiments, the receiving at stages 604 and 608 are performed substantially concurrently by a single gateway node of a communications network.

At stage 612, embodiments can compute a coexistence resource grid from the first communication resource grid and the second communication resource grid to define a division of transmission resources into sub-carriers of a carrier frequency according to a coexistence sub-carrier definition and into timeslots according to a coexistence timeslot definition. In some embodiments, the computing at stage 612 includes determining, prior to the scheduling the first data signal, a size of the first subset of the sub-carriers in accordance with a predetermined bandwidth allocation for the first data signal; and computing the coexistence resource grid to have a same coexistence sub-carrier definition for each of the plurality of timeslots by assigning the first subset of the sub-carriers for each timeslot of the plurality of timeslots to the first data signal (e.g., the scheduling the first data signal, described below in stage 616 can be in accordance with the assigning). In some embodiments, the computing at stage 612 includes determining (e.g., prior to the scheduling the first data signal in stage 616, as described below), a size of the first subset of the timeslots in accordance with a predetermined bandwidth allocation for the first data signal; and computing the coexistence resource grid by assigning the all of the plurality of the sub-carriers to the first data signal only for each timeslot of the first subset of the timeslots. In some embodiments, the computing at stage 612 includes determining a first sub-carrier size from the first sub-carrier definition; determining a second sub-carrier size from the second sub-carrier definition; and computing the coexistence resource grid to define the division of transmission resources into the plurality of sub-carriers, such that each of the plurality of sub-carriers has a coexistence sub-carrier size that is a common multiple of the first sub-carrier size and the second sub-carrier size. In some embodiments, the computing at stage 612 includes determining a first timeslot size from the first timeslot definition; determining a second timeslot size from the second timeslot definition; and computing the coexistence resource grid to define the division of transmission resources into the plurality of timeslots, such that each of the plurality of timeslots has a coexistence timeslot size that is a common multiple of the first timeslot size and the second timeslot size.

At stage 616, embodiments can generate a first radio signal for transmission of the first data signal over the carrier frequency by scheduling the first data signal, according to the coexistence resource grid, to consume a first subset of the sub-carriers and a first subset of the timeslots. At stage 620, embodiments can generate a second radio signal for transmission of the second data signal over the carrier frequency by scheduling at least a portion of the second data signal to consume a second subset of the sub-carriers and a second subset of the timeslots of a remaining portion of the coexistence resource grid subsequent to the scheduling the first data signal. In some embodiments, the generating the second data signal at stage 620 includes determining, responsive to the scheduling the first data signal in stage 616, the remaining portion of the coexistence resource grid, and opportunistically scheduling the at least the portion of the second data signal to consume the second subset of the sub-carriers and the second subset of the timeslots of the remaining portion responsive to the determining. In some embodiments, the first data signal is received at stage 604 from a first content source, and the first radio signal is generated at stage 616 for transmission over a first wireless network configured according to the first radio technology; and the second data signal is received at stage 608 from a second content source, and the second radio signal is generated at stage 620 for transmission over a second wireless network configured according to the second radio technology. In some embodiments, the radio signals are generated at stages 616 and 620 to be orthogonal frequency-division multiplexing (OFDM) signals. For example, the first radio technology accords with Advanced Television Systems Committee (ATSC) 3.0 standards; and the second radio technology accords with Third Generation Partnership Project (3GPP) standards. In some embodiments, at stage 624, the method 600 can transmit the first radio signal and the second radio signal concurrently over the carrier frequency.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A gateway system for coexistence of multiple radio technologies in a shared carrier, the gateway system comprising:
   a receiver subsystem to receive a first data signal for communication via a first radio technology that defines a first communication resource grid having a first sub-carrier definition and a first timeslot definition, and to receive a second data signal for communication via a second radio technology that defines a second communication resource grid having a second sub-carrier definition and a second timeslot definition;
   a coexistence scheduler to compute a coexistence resource grid from the first communication resource grid and the second communication resource grid to define a division of transmission resources into a plurality of sub-carriers of a carrier frequency according to a coexistence sub-carrier definition and into a plurality of timeslots according to a coexistence timeslot definition;
   a first radio-technology-specific scheduler, coupled with the coexistence scheduler and having the first communication resource grid stored in communication therewith, to generate a first radio signal by scheduling the first data signal to consume a first subset of the sub-carriers and a first subset of the timeslots of the coexistence resource grid in accordance with the first radio technology; and
   a second radio-technology-specific scheduler, coupled with the coexistence scheduler and having the second communication resource grid stored in communication therewith, to generate a second radio signal by scheduling at least a portion of the second data signal to consume a second subset of the sub-carriers and a second subset of the timeslots of a remaining portion of the coexistence resource grid subsequent to the scheduling the first data signal in accordance with the second radio technology.

2. The gateway system of claim 1, further comprising:
   a transmitter subsystem comprising a radiofrequency antenna to concurrently transmit the first radio signal and the second radio signal wirelessly over the carrier frequency.

3. The gateway system of claim 2, wherein the transmitter subsystem is to transmit the first radio signal and the second radio signal as orthogonal frequency-division multiplexing (OFDM) signals.

4. The gateway system of claim 1, wherein the coexistence scheduler is to compute further by:
   determining, prior to the scheduling the first data signal, a size of the first subset of the sub-carriers in accordance with a predetermined bandwidth allocation for the first data signal; and
   computing the coexistence resource grid to have a same coexistence sub-carrier definition for each of the plurality of timeslots by assigning the first subset of the sub-carriers for each timeslot of the plurality of timeslots to the first data signal,
   wherein the first radio-technology-specific scheduler is to schedule the first data signal in accordance with the assigning.

5. The gateway system of claim 1, wherein the coexistence scheduler is to compute further by:
   determining, prior to the scheduling the first data signal, a size of the first subset of the timeslots in accordance with a predetermined bandwidth allocation for the first data signal; and
   computing the coexistence resource grid by assigning the all of the plurality of the sub-carriers to the first data signal only for each timeslot of the first subset of the timeslots,
   wherein the first radio-technology-specific scheduler is to schedule the first data signal in accordance with the assigning.

6. The gateway system of claim 1, wherein:
   the coexistence scheduler is to compute further by determining, responsive to the first radio-technology-specific scheduler scheduling the first data signal, the remaining portion of the coexistence resource grid; and
   the second radio-technology-specific scheduler is to schedule the at least the portion of the second data signal by opportunistically scheduling the at least the portion of the second data signal to consume the second subset of the sub-carriers and the second subset of the timeslots of the remaining portion responsive to the determining by the coexistence scheduler.

7. The gateway system of claim 1, wherein the coexistence scheduler is to compute further by:
   receiving, from the first radio-technology-specific scheduler, a first sub-carrier size of the first sub-carrier definition and a first timeslot size of the first timeslot definition;
   receiving, from the second radio-technology-specific scheduler, a second sub-carrier size of the second sub-carrier definition and a second timeslot size of the second timeslot definition;

determining whether the second sub-carrier size differs from the first sub-carrier size and/or the second timeslot size differs from the first timeslot size; and computing the coexistence resource grid to define the division of transmission resources into the plurality of sub-carriers and into the plurality of timeslots, such that:
- in response to determining that the second sub-carrier size differs from the first sub-carrier size, each of the plurality of sub-carriers is computed to have a coexistence sub-carrier size that is a common multiple of the first sub-carrier size and the second sub-carrier size; and
- in response to determining that the second timeslot size differs from the first timeslot size, each of the plurality of timeslots is computed to have a coexistence timeslot size that is a common multiple of the first timeslot size and the second timeslot size.

8. The gateway system of claim 1, wherein:
the receiver subsystem is in communication with a first content source and a second content source;
the first data signal is received from the first content source and destined for receipt by a first plurality of wireless receiver devices via a first wireless network; and
the second data signal is received from the second content source and destined for receipt by a second plurality of wireless receiver devices via a second wireless network.

9. The gateway system of claim 8, wherein:
the first wireless network is a digital broadcast television network configured according to Advanced Television Systems Committee (ATSC) 3.0 standards; and
the second wireless network is a mobile wireless Internet network configured according to Third Generation Partnership Project (3GPP) standards.

10. A method for coexistence of multiple radio technologies in a shared carrier, the method comprising:
receiving a first data signal for communication via a first radio technology that defines a first communication resource grid having a first sub-carrier definition and a first timeslot definition;
receiving a second data signal for communication via a second radio technology that defines a second communication resource grid having a second sub-carrier definition and a second timeslot definition;
computing a coexistence resource grid from the first communication resource grid and the second communication resource grid to define a division of transmission resources into a plurality of sub-carriers of a carrier frequency according to a coexistence sub-carrier definition and into a plurality of timeslots according to a coexistence timeslot definition;
generating a first radio signal for transmission of the first data signal over the carrier frequency by scheduling the first data signal, according to the coexistence resource grid, to consume a first subset of the sub-carriers and a first subset of the timeslots; and
generating a second radio signal for transmission of the second data signal over the carrier frequency by scheduling at least a portion of the second data signal to consume a second subset of the sub-carriers and a second subset of the timeslots of a remaining portion of the coexistence resource grid subsequent to the scheduling the first data signal.

11. The method of claim 10, further comprising:
transmitting the first radio signal and the second radio signal concurrently over the carrier frequency.

12. The method of claim 10, wherein the computing further comprises:
determining, prior to the scheduling the first data signal, a size of the first subset of the sub-carriers in accordance with a predetermined bandwidth allocation for the first data signal; and
computing the coexistence resource grid to have a same coexistence sub-carrier definition for each of the plurality of timeslots by assigning the first subset of the sub-carriers for each timeslot of the plurality of timeslots to the first data signal,
wherein the scheduling the first data signal is in accordance with the assigning.

13. The method of claim 10, wherein the computing further comprises:
determining, prior to the scheduling the first data signal, a size of the first subset of the timeslots in accordance with a predetermined bandwidth allocation for the first data signal; and
computing the coexistence resource grid by assigning the all of the plurality of the sub-carriers to the first data signal only for each timeslot of the first subset of the timeslots, wherein the scheduling the first data signal is in accordance with the assigning.

14. The method of claim 10, wherein the generating the second data signal further comprises determining, responsive to the scheduling the first data signal, the remaining portion of the coexistence resource grid, and opportunistically scheduling the at least the portion of the second data signal to consume the second subset of the sub-carriers and the second subset of the timeslots of the remaining portion responsive to the determining.

15. The method of claim 10, wherein the computing further comprises:
determining a first sub-carrier size from the first sub-carrier definition;
determining a second sub-carrier size from the second sub-carrier definition; and
computing the coexistence resource grid to define the division of transmission resources into the plurality of sub-carriers, such that each of the plurality of sub-carriers has a coexistence sub-carrier size that is a common multiple of the first sub-carrier size and the second sub-carrier size.

16. The method of claim 10, wherein the computing further comprises:
determining a first timeslot size from the first timeslot definition;
determining a second timeslot size from the second timeslot definition; and
computing the coexistence resource grid to define the division of transmission resources into the plurality of timeslots, such that each of the plurality of timeslots has a coexistence timeslot size that is a common multiple of the first timeslot size and the second timeslot size.

17. The method of claim 10, wherein:
the first data signal is received from a first content source, and the first radio signal is generated for transmission over a first wireless network configured according to the first radio technology; and
the second data signal is received from a second content source, and the second radio signal is generated for transmission over a second wireless network configured according to the second radio technology.

18. The method of claim 10, wherein the radio signals are generated to be orthogonal frequency-division multiplexing (OFDM) signals.

19. The method of claim 10, wherein:
the first radio technology accords with Advanced Television Systems Committee (ATSC) 3.0 standards; and
the second radio technology accords with Third Generation Partnership Project (3GPP) standards.

20. The method of claim 10, wherein the receiving the first data signal and the receiving the second data signal are performed substantially concurrently by a single gateway node of a communications network.

* * * * *